(No Model.)  2 Sheets—Sheet 1.
P. B. DELANY.
MEANS FOR ACTUATING AND CORRECTING THE VIBRATIONS OF REEDS.
No. 322,696. Patented July 21, 1885.
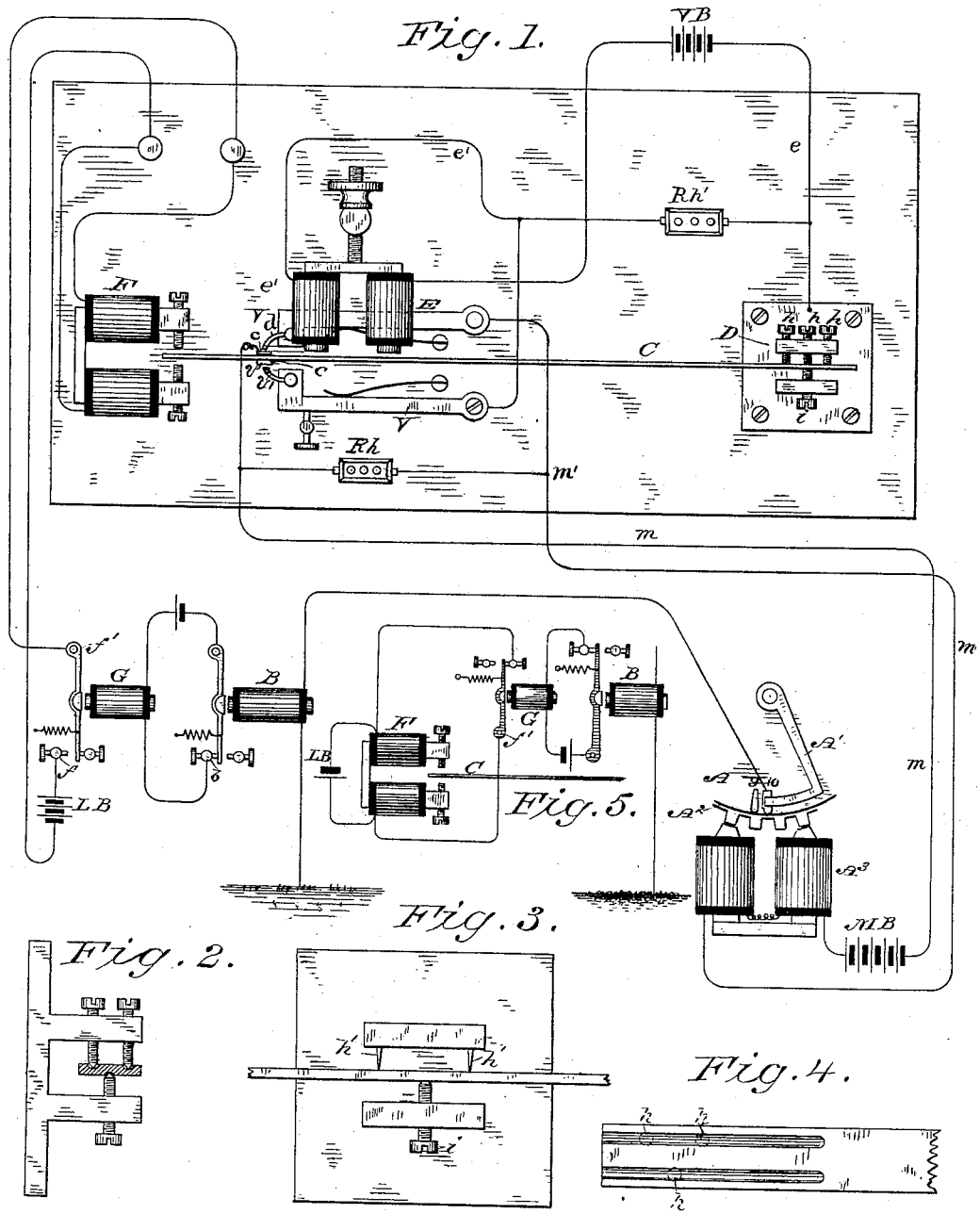
WITNESSES
Ed. A. Newman
Al: C. Newman
INVENTOR
Patrick B. Delany
By his Attorneys
Baldwin, Hopkins & Peyton (No Model.) 2 Sheets—Sheet 2.

P. B. DELANY.
MEANS FOR ACTUATING AND CORRECTING THE VIBRATIONS OF REEDS.

No. 322,696. Patented July 21, 1885.

WITNESSES
Ed. A. Newman.
Al. C. Newman.

INVENTOR
Patrick B. Delany.
By his Attorneys
Baldwin, Hopkins & Peyton

United States Patent Office.

PATRICK B. DELANY, OF NEW YORK, N. Y., ASSIGNOR TO THE STANDARD MULTIPLEX TELEGRAPH COMPANY, OF SAME PLACE.

MEANS FOR ACTUATING AND CORRECTING THE VIBRATIONS OF REEDS.

SPECIFICATION forming part of Letters Patent No. 322,696, dated July 21, 1885.

Application filed April 23, 1885. (No model.)

*To all whom it may concern:*

Be it known that I, PATRICK B. DELANY, of New York city, State of New York, have invented certain new and useful Improvements in Devices for Actuating and Correcting the Vibrations of Reeds, &c., of which the following is a specification.

In various electrical apparatus in which vibrators are employed the successful operation depends upon the proper adjustment or control of the rate of vibration. For instance, in several Letters Patent of the United States granted to me October 9, 1883, I have shown systems of electrical synchronous movements designed for telegraphic and other purposes in which I prefer to employ a vibrating reed or fork.

My present invention constitutes an improved manner of regulating and controlling the vibrations of reeds, &c.

Figure 6:
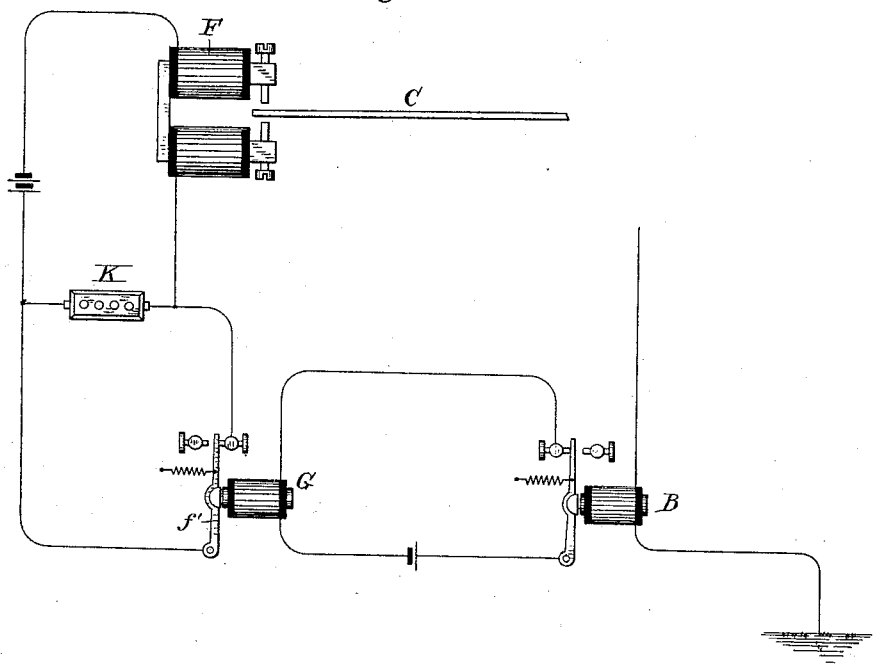
Figure 7:
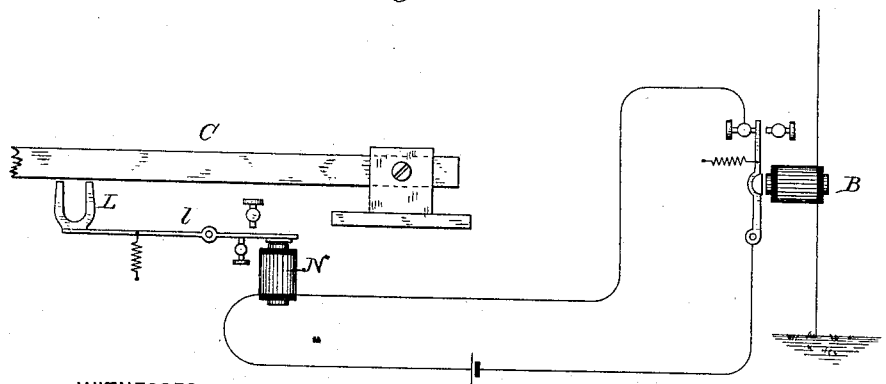

In the accompanying drawings, Figure 1 is a plan view partly in diagram; Fig. 2, a detail sectional view illustrating the manner of holding the reed. Fig. 3 is a similar plan view. Fig. 4 is a view showing the longitudinally-grooved end of the reed. Fig. 5 is a view illustrating a slight modification of the arrangement of magnets for effecting the correction, and Figs. 6 and 7 are views illustrating other modifications.

A represents a portion of a circular table on which insulated contacts are to be arranged. Some of these contacts—say the 9's and 10's, one 9 and one 10 being illustrated in the drawings—I utilize for the purpose of correcting the apparatus or maintaining the synchronous movement. The contacts on the table are traversed by a rotary circuit-completer, A′, which is fast on the spindle of the armature-disk A², which is rotated by the magnet A³. All these details are fully set forth in my patents above mentioned, and further illustration or description is therefore unnecessary.

The correcting 10-contact is connected through the coil of a relay, B, to earth, by which arrangement a correcting impulse, when received through the 10-contact, is made effective, as is presently described. The reed C is mounted in a suitable support, D, the details of which are hereinafter described.

The vibrator magnet E is arranged in suitable relation to the side of the reed, and the coils are connected in the circuit of a vibrator battery, VB. One pole of this battery is connected by a wire, $e$, with the support D of the reed. The circuit extends through this support and the reed to a platinum contact, $v$, with which a light contact-finger, $v'$, on a pivoted adjustable arm, V, makes contact as the reed vibrates. This arm is connected by a wire, $e'$, through the coils of the vibrator magnet E, to the opposite pole of said battery. An impulse of vibration having been imparted to the reed, the circuit of the battery VB will be automatically made and broken at the contacts $v\ v'$, so that the reed will continue to vibrate. The coils of the motor-magnet A³ are included in the circuit of the battery M B. One pole of said battery is connected by a wire, $m$, with an insulated contact, $c$, on the vibrator, against which a spring-finger, $d$, makes contact. The finger $d$ is carried on an adjustable arm from which the circuit passes through the coils of the motor-magnet A³ to the opposite pole of said battery.

Rh and Rh′ are ordinary resistances thrown around the contacts $v\ v'$ and $c\ d$, to prevent sparking. An impulse of rotation having been imparted to the armature-disk A², the disk will be continuously rotated by the action of the magnet A³. By keeping the circuits of the vibrator-magnet and of the motor-magnet entirely separate and distinct from each other there is no disturbance of the vibrator by the inductive effect of the motor-circuit on the vibrator-circuit, and there is therefore a more uniform motion of the vibrator.

A correcting-magnet, F, is preferably arranged so that its poles embrace or extend on the opposite sides of the reed, and its coils are connected in circuit with a local battery, LB, which is opened and closed at the back stop, $f$, of a vibrating armature, $f'$, of a magnet, G. The circuit of the magnet G is opened and closed at the back stop, $b$, of the armature of the relay B. In the normal position—that is, when a correcting impulse is not being received—the armature of the magnet remains against its back post, thus closing the local of the magnet G and opening the circuit of the correcting-magnet F. Should the reed vibrate too rapidly, a correcting impulse of electricity would be received through the 10-contact, as fully described in my patents before mentioned. Such impulse would energize the magnet B, which would attract its armature, and thus cause the armature $f'$ to fall against its back contact, $f$, thus closing the local circuit of the correcting-magnet F. The poles of the magnet F being arranged on opposite sides of the reed create a magnetic field in which the reed vibrates, and thus causes the reed to vibrate more slowly. By thus enveloping the vibrating reed in a magnetic field, to retard its vibration the correcting impulses of electricity are very efficiently utilized, and a distinction exists between such a manner of correction and that resulting from the use of a magnet having its pole or poles arranged upon one side only of the vibrating tongue, bar, or reed.

Heretofore in this class of apparatus, so far as I am aware, where the vibrator has been retarded by increasing the power of the vibrator-magnet or by the use of a supplementary magnet applied at the side of the vibrator, a greater amplitude, but a slower rate, have been given the vibrator. In my arrangement above described, however, by the use of the independent correcting-magnet, the poles of which envelope the vibrator, the rate and amplitude are both decreased, an operation which causes a smoother and more uniform action of the vibrator. In the present arrangement the circuit of the vibrator-magnet is unchanged, and the speed of the vibrator is corrected by the creation or annihilation or modification of an independent correcting magnetic field. With such an organization the corrections are most efficiently utilized, because it will be obvious when the vibrator-magnet is uniform the tendency for the vibrator to move at a uniformly normal rate is constant, and the corrections for effecting an acceleration or retardation in the rate are caused to act directly on the vibrator and not on its vibrating circuit. A fundamental distinction, therefore, exists between such an apparatus and apparatus in which the correction is effected by varying the strength of the vibrator-magnet. By the use of a vibrating reed such as illustrated in the drawings, I can most efficiently control its speed by enveloping it between the poles of a correcting-magnet, as shown at F, and a distinction exists between such an arrangement and that shown, for instance, in my Patent No. 286,274, in which a correcting-magnet embraces the fork, so that one pole acts on the outside of one tine and the other pole on the outside of the other tine.

Under the arrangement shown in Fig. 1 the existence of a magnetic field at F retards the rate of vibration, while its annihilation permits the vibrator to move more rapidly. In like manner the increase in power in such a magnetic field causes a retardation and a decrease in power an acceleration. Of course the increase or decrease of the power in the independent correcting-field may be accomplished by varying the resistance of the circuit of the magnet F, as set forth in my Patent No. 286,281, or by varying the relation of the field of the vibrator, as shown in my Patent No. 286,276.

Obviously, if with the identical apparatus shown in Fig. 1 the connections were made so that the circuit of the magnet F was normally closed, then the vibration of the reed would be normally retarded, and when a correcting impulse is received to open the circuit of the magnet F the vibrator would vibrate more rapidly. The apparatus may therefore be arranged for correction either by retardation or acceleration. The circuits and magnets may of course be so arranged as to make the received correcting impulse, whatever may be its character, effective when the relay-armature leaves its front contact. Such an arrangement is shown in Fig. 5. There ordinarily, the current of the local battery LB is shunted from the coils of the magnet F when the armature $f'$ of the magnet G is against its front contact. When the armature is, however, released and leaves its front contact, the local battery LB becomes effective in the coils of the magnet F.

In Fig. 6 I have indicated the manner of effecting the correction of the vibrator by varying the power of the independent correcting-magnet by means of changing the resistance of its circuit. In this arrangement the current from the local battery normally flows through the coils of the magnet F, as clearly shown. When a correcting impulse is received, as before described, the resistance K will be thrown into the circuit by the movement of the armature $f'$ away from its front contact, the electro-magnetic power of the magnet F will be decreased, and the vibrator, being partially relieved from the retarding effects of the independent correcting-field, will vibrate more rapidly. Of course a similar arrangement for effecting the correction by eliminating a resistance from the local correcting circuit is obvious.

In Fig. 7 I have shown an arrangement which may be employed for changing the relation of the controlling or correcting magnetic field to the vibrator. I have before remarked that an arrangement similar to that shown in my Patent No. 286,276 may be employed—that is, the pole of an electro-magnet may be caused to approach or recede from the vibrator. In Fig. 7, however, I illustrate a permanent magnet. Such a magnet, L, is carried on the end of an armature-lever, $l$, pivoted between its ends and controlled by an electro-magnet, M, included in a local circuit, which is made and broken by the correcting-relay B. Normally the armature of the relay B rests upon its back stop, thus closing the local circuit of magnet M and holding the correcting-magnet L in proximity to the vibrator. When a correcting impulse is received, the local of the magnet M is momentarily broken and the magnet L is drawn away from the vibrator by the coil-spring of the armature-lever *l*. This causes a retardation or decrease of the rate of vibration. Of course a similar arrangement for causing the approach of the magnet to the vibrator to effect its acceleration when the correcting impulse is received is obvious.

By the use of a local circuit I am enabled to maintain the magnetic field independent of the vibrator-magnet and effect the requisite corrections by varying the power of such field; or, in an arrangement similar to that shown in Fig. 7, the magnet may be more effectively controlled in its relation to the vibrator. I have demonstrated by experiment that the enveloping of the reed by the poles of the correcting-magnet, as illustrated in Fig. 1, produces a retardation when the magnet is energized, and vice versa.

In order to vary the normal rate of vibration of the reed it may be mounted in its support or post D so as to be adjustable endwise. Broadly, such an arrangement is old, and I do not therefore claim it.

It will be noted upon reference to Figs. 1 and 2 that I clamp or hold the reed at more than two points at one end, and that it is free to vibrate at the other, like an ordinary reed. For instance, in Fig. 1 three clamping-screws, *h h h*, are arranged on one side of the reed in triangular relation to each other, as shown by the dotted circles in Fig. 4, and one, *i*, on the other. Instead of having the screws flattened on the end, as shown in Fig. 1, I prefer to make them pointed, and have them enter longitudinal grooves in the sides of the vibrator; or, as shown in Fig. 3, I may employ two knife-edges, *h′ h′*, in connection with an opposing screw, *i*. However, whatever the arrangement may be, it should be noted that I clamp the vibrator at two or more points. I have discovered that where the vibrating reed is so held a slight loosening or tightening of one or more of the holding screws or clamps will affect the normal rate of vibration, so that the vibration of the reed may be most delicately adjusted by the manipulation of one or more of the clamping-screws. By this manner of adjusting the normal rate of the reed, combined with my improved manner of effecting corrections in its rate of vibration, the vibrator can be perfectly controlled.

I claim as my invention—

1. The combination of a vibrator, the vibrator-magnet, its circuit, magnetic correcting devices independent of the vibrator-magnet, the local circuit of said correcting devices, and a relay in the main line for effecting the correction.

2. The combination of the vibrating reed or bar, the vibrator-magnet, and the independent correcting-magnet having its poles arranged to envelop and act on both sides of the vibrator.

3. The combination of the vibrator, the vibrator-magnet, the independent correcting-magnet, its circuit and battery, the current from which normally does not flow through the coils of the correcting-magnet, and devices, substantially such as described, whereby the local battery of the correcting-magnet is caused to flow through its coils to correct the vibrator upon the passage of a correcting impulse over the line.

4. The combination of the vibrator, its local driving-circuit, which is automatically made and broken by the vibrator, the motor and its circuit arranged entirely independent of the vibrator-circuit, and also automatically made and broken by the vibrator.

5. The combination of the vibrator, devices for supporting or clamping it at two or more points, the vibrator-magnet, its circuit, and the independent magnetic correcting devices.

6. The combination of the vibrating reed, devices for adjusting it endwise in its support, the vibrator-magnet for automatically actuating the reed, and a supplementary correcting-magnet for correcting its rate of vibration.

7. The combination of the vibrator free to vibrate at one end, and devices for supporting the vibrator, which clamp it at two or more points at the other end, for the purpose set forth.

8. The combination of the endwise-adjustable vibrator, its support, and clamping-screws or holders, which clamp the vibrator at two or more points at one end only, for the purpose set forth.

9. The combination of the longitudinally-grooved vibrator, its support, and the pointed clamping-screws which enter the grooves in the vibrator.

10. The combination of the vibrator, means for clamping or supporting it at two or more points, the vibrator-magnet, and a correcting-magnet.

In testimony whereof I have hereunto subscribed my name.

PATRICK B. DELANY.

Witnesses:
GEORGE H. WIRTH,
WENDELL GOODWIN.